United States Patent
Mannhart et al.

(10) Patent No.: US 10,781,961 B2
(45) Date of Patent: Sep. 22, 2020

(54) PIPE COUPLING FOR CONNECTING TWO PIPE ENDS OR PIPE CLAMP FOR SEALING A DEFECTIVE PIPE

(71) Applicant: STRAUB WERKE AG, Wangs (CH)

(72) Inventors: Hubert Mannhart, Sargans (CH); Damir Sudar, Bad Ragaz (CH)

(73) Assignee: STRAUB WERKE AG, Wangs (CH)

(*) Notice: Subject to any disclaimer, the term of this patent is extended or adjusted under 35 U.S.C. 154(b) by 169 days.

(21) Appl. No.: 15/545,779

(22) PCT Filed: Jan. 26, 2016

(86) PCT No.: PCT/IB2016/050382
§ 371 (c)(1),
(2) Date: Jul. 24, 2017

(87) PCT Pub. No.: WO2016/120788
PCT Pub. Date: Aug. 4, 2016

(65) Prior Publication Data
US 2018/0003333 A1    Jan. 4, 2018

(30) Foreign Application Priority Data

Jan. 26, 2015 (EP) .................................. 15152574

(51) Int. Cl.
*F16L 55/172* (2006.01)
*F16L 21/00* (2006.01)
*F16L 21/06* (2006.01)

(52) U.S. Cl.
CPC ........... *F16L 55/172* (2013.01); *F16L 21/005* (2013.01); *F16L 21/065* (2013.01)

(58) Field of Classification Search
CPC ..... F16L 55/172; F16L 21/005; F16L 21/065; F16L 21/06
USPC .................................. 285/15, 373, 420, 419
See application file for complete search history.

(56) References Cited

U.S. PATENT DOCUMENTS

| | | | | |
|---|---|---|---|---|
| 4,127,290 | A | * | 11/1978 | Mutschlechner ....... F16L 21/06 |
| 4,381,020 | A | | 4/1983 | Daghe |
| 5,288,108 | A | | 2/1994 | Eskew |
| 5,310,223 | A | | 5/1994 | Straub |

(Continued)

FOREIGN PATENT DOCUMENTS

| | | |
|---|---|---|
| DE | 4411062 C1 | 12/1995 |
| DE | 69715400 T2 | 5/2003 |

(Continued)

OTHER PUBLICATIONS

International Search Report for corresponding PCT Application No. PCT/IB2016/050382, 4 pages, dated Apr. 14, 2016.

(Continued)

*Primary Examiner* — Zachary T Dragicevich
(74) *Attorney, Agent, or Firm* — Matthew B. Dernier, Esq.

(57) ABSTRACT

A pipe coupling or a pipe clamp has an outer clamp band with an outer longitudinal slot, an inner clamp band with an inner longitudinal slot and a tensioning mechanism arranged on the outer clamp band. The inner longitudinal slot is offset in relation to the outer longitudinal slot. A separate flat spanning element is provided on the inner clamp band in order to span the inner longitudinal slot. The spanning element extends from one side of the inner longitudinal slot towards the other side of said longitudinal slot.

5 Claims, 4 Drawing Sheets

(56) References Cited

U.S. PATENT DOCUMENTS

| | | | | |
|---|---|---|---|---|
| 5,722,695 A * | 3/1998 | Matsumoto | ............ | F16L 21/005 |
| 6,457,748 B1 | 10/2002 | Webb | | |
| 2006/0175837 A1* | 8/2006 | Ignaczak | ............... | F16L 21/065 |
| | | | | 285/420 |
| 2011/0210546 A1* | 9/2011 | Geese | .................. | F16L 21/005 |

FOREIGN PATENT DOCUMENTS

| | | |
|---|---|---|
| EP | 0551582 A1 | 7/1993 |
| EP | 0900346 B1 | 9/2002 |
| GB | 2303677 A | 2/1997 |
| GB | 2389395 A | 12/2003 |
| WO | 9202752 A1 | 2/1992 |

OTHER PUBLICATIONS

Statement by Geoffrey King, Teekay, Taylor Kerr Engineering Limited, 7 pages, dated Feb. 26, 2018.
Type Approval Certificate, Taylor Kerr Engineering Limited, No. 13817, 5 pages, dated Apr. 28, 2011.
Type Approval Certificate, Taylor Kerr Engineering Limited, No. 14494, 4 pages, dated Jul. 2, 2013.
Teekay Rohrkupplungen GmbH Invoice Nos. 20111349 and 20111511, 2 pages, dated Jul. 7, 2011 and Aug. 15, 2011 (these invoices show the sale of products illustrated in NPL #5 listed in this IDS).
Installation Drawings sold under invoices 20111349 and 20111511, 1 page dated Jul. 8, 2011 (these drawings show products sold according to the invoices listed in NPL # 4 listed in this IDS).

* cited by examiner

PIPE COUPLING FOR CONNECTING TWO PIPE ENDS OR PIPE CLAMP FOR SEALING A DEFECTIVE PIPE

BACKGROUND

The invention relates to a pipe coupling or a pipe clamp.

Pipe couplings are used to connect two mutually facing pipe ends. Such a pipe coupling is also designated as pipe clamp or clamping collar.

In order to ensure a fit-for-purpose connection of the pipes to one another, a sufficient bracing of the pipe coupling must be accomplished.

If a pipe coupling is used as a pipe clamp for sealing a defective pipe, this is placed around the defective pipe section and braced. A sufficient bracing of the pipe coupling must also be accomplished here to ensure a satisfactory seal.

In order to absorb the compressive forces produced, which are present in the pipes or pipelines as a result of high internal pressures in some cases, very high clamping forces must be applied to the pipe coupling or to the pipe clamp. This requires a correspondingly solid configuration of the clamp band of the pipe coupling.

In order to further improve the tightness of the created connection, sealing inserts are provided, for example, on the inner side of the pipe coupling or the pipe clamp, which or the relevant ones, are held in the desired position by means of the braced clamp band. These sealing inserts can be part of the pipe coupling. A uniform bracing is advantageous for a fit-for-purpose seal.

Known from WO 92/02752 A1 is a pipe coupling for connecting two pipe ends which comprises an outer longitudinal slot with mutually opposite outer longitudinal slot sides, an inner clamp band comprising an inner longitudinal slot with mutually opposite inner longitudinal slot sides and a tensioning mechanism arranged on the outer clamp band for reducing the inside diameter of the clamp bands. The inner longitudinal slot is located opposite the outer longitudinal slot. A sealing insert is provided on the inside of the inner clamp band.

Known from DE69715400T2 is another pipe coupling for connecting two pipe ends which comprises an outer clamp band, an inner clamp band and a tensioning mechanism for reducing the inside diameter of the clamp bands arranged on the outer clamp band. A layer of fire-resistant heat-insulating material is arranged between the outer clamp band and the inner clamp band. In this pipe coupling, the inner longitudinal slot is also located opposite to the outer longitudinal slot. A sealing insert is provided on the inside of the inner clamp band.

A disadvantage of these known solutions is that when actuating the tensioning mechanism, the free edges or the mutually opposite inner longitudinal slot sides can tilt with the sealing insert and thus a non-uniform bracing can occur.

EP0551582A1 discloses a pipe coupling which has a lengthwise split cylindrical one-part housing casing with inwardly bent radial end walls as outer clamp band. A flat insert plate bridging the housing gap of the housing casing bears against the inner side of the housing casing. The finite insert plate is aligned with respect to the housing gap in such a manner that its longitudinal gap lies diametrically opposite the housing gap. In addition, on the inside of the insert plate a V-shaped support ring is provided for lateral support of the sleeve-like sealing insert arranged on the inside.

A disadvantage with these known solutions is that here also when actuating the tensioning mechanism, the free edges or the mutually opposite inner longitudinal slot sides can tilt with the sealing insert and thus non-uniform bracings can occur. The V-shaped support ring cannot prevent tilting of the mutually opposite inner longitudinal slot sides with the sealing insert since this only laterally supports the sealing insert.

Known from DE4411062C1 is an axial traction-relief clamp which comprises a two-part outer clamp band (connecting element) with two tensioning mechanisms and a one-part inner clamp band with its own tensioning mechanism. The tensioning mechanism of the inner clamp band is radially offset to the tensioning mechanisms of the outer clamp band.

A disadvantage of this known solution is the complex structure of this pipe clamp which in particular results in high manufacturing costs. In addition, this known solution is not, or only to a certain extent, suitable for sealing a defective pipe for economic reasons.

SUMMARY

It is therefore the object of the present invention to provide a pipe coupling or a pipe clamp which does not have the aforesaid disadvantages and in particular is suitable as a repair clamp and enables more advantageous bracing of the pipe coupling.

The object is solved by the features of the independent claims. Advantageous further developments are set out in the figures and in the respective dependent patent claims.

According to a first approach of the invention, a pipe coupling or a pipe clamp comprises an outer clamp band which has at least one outer longitudinal slot with mutually opposite outer longitudinal slot sides, an inner clamp band which has at least one inner longitudinal slot with mutually opposite inner longitudinal slot sides and at least one tensioning mechanism arranged on the outer clamp band for reducing the inner diameter of the clamp bands wherein the at least one inner longitudinal slot is arranged offset with respect to the outer longitudinal slot. A separate flat spanning element is further provided to span the at least one inner longitudinal slot on the inner clamp band which extends from one inner longitudinal slot side in the direction of the other inner longitudinal slot side.

The term " . . . longitudinal . . . " in connection with the outer longitudinal slot and inner longitudinal slot relates to the pipe longitudinal axis of the pipe or the pipes on which the pipe coupling or the pipe claim is arranged. In other words, the outer longitudinal slot and also the inner longitudinal slot run transversely to the arcuate profile of the clamp band.

Such a pipe coupling or pipe clamp is characterized by uniform bracing properties where tilting neither of the inner clamp band or of the outer clamp band can take place.

As a result of this configuration of the pipe coupling or pipe clamp, the radial components of the screw forces produced during bracing of the tensioning mechanism are captured in a very stiff system and advantageously led off. In the area of the flat spanning element, a three-layer reinforcement is provided which allows the absorption of high force components without any deformation of the corresponding section of the pipe coupling or pipe clamp.

In pipes made of a soft material which can be easily deformed under load or with a corresponding pipe outer side, tilting of the inner longitudinal slot sides with the pipe outer side is prevented with the pipe coupling or pipe clamp according to the invention.

If a sealing insert is provided, any jamming of the sealing insert between the mutually opposite inner longitudinal slot sides during the bracing process is largely avoided with the pipe coupling or pipe clamp according to the invention, which ensures a tight connection of the pipes to be connected. In addition, a uniform pressing of the sealing insert along the entire circumference of the corresponding pipe section is ensured.

The pipe coupling or pipe clamp according to the invention is at the same time easy to manufacture and easy to assemble.

The at least one flat spanning element advantageously has an extension which is also sufficient for covering the at least one inner longitudinal slot in the unbraced state of the pipe coupling or pipe clamp.

Preferably the at least one flat spanning element is fixed on one side on the inner clamp band so that during mounting of the pipe coupling or pipe clamp, the flat spanning element cannot be lost and thus the pipe coupling or pipe clamp can easily be mounted. The flat spanning element is advantageously fixed positively and/or non-positively on a sectional region of the inner clamp band, for example, by means of at least one weld point, at least one solder point, at least one rivet, at least one screw, at least one clinch point or an adhesive. The type of fixing is selected according to the type of material of the elements to be joined.

Preferably the inner clamp band is fixed on the outer clamp band with the result that the pipe coupling or pipe clamp can be mounted particular easily. The inner clamp part is advantageously fixed positively and/or non-positively on the outer clamp part, for example, by means of at least one weld point, at least one solder point, at least one rivet, at least one screw, at least one clinch point or an adhesive. The type of fixing is selected according to the type of material of the elements to be joined.

Alternatively, the inner clamp band is configured at least in two parts, with the result that the pipe coupling or the pipe clamp can easily be mounted more simply as a result of the resulting flexibility. Particularly advantageously each inner clamp band part is fixed on the outer clamp band. The inner clamp parts are advantageously fixed positively and/or non-positively on the or—if several outer clamp parts are provided—on the outer clamp parts, for example by means of at least one weld point, at least one solder point, at least one rivet, at least one screw, at least one clinch point or an adhesive. The type of fixing is selected according to the type of material of the elements to be joined.

Advantageously for each inner longitudinal slot respectively one spanning element is provided for spanning the same with the result that during the tensioning process any jamming of the sealing insert at each inner longitudinal slot is eliminated. Each flat spanning element advantageously has an extension which is sufficient for covering the respective inner longitudinal slot even in the unbraced state of the pipe coupling or the pipe clamp.

In a second alternative approach of the invention, a pipe coupling or a pipe clamp for connecting two pipe ends or a pipe clamp for sealing a defective pipe comprises an outer clamp band which has at least one outer longitudinal slot with mutually opposite outer longitudinal slot sides, an inner clamp band which has at least one inner longitudinal slot with mutually opposite inner longitudinal slot sides and at least one tensioning mechanism arranged on the outer clamp band for reducing the inner diameter of the clamp bands. The outer clamp band is configured at least in two parts, wherein respectively one outer longitudinal slot is formed between the ends of the at least two outer clamp band parts. The inner clamp band is configured at least in two parts, wherein respectively one inner longitudinal slot is formed between the ends of the at least two inner clamp band parts, wherein at least one of the inner longitudinal slots is arranged offset with respect to the outer longitudinal slots.

In this alternative solution, as a result of this configuration of the pipe coupling or pipe clamp, the radial components of the screw forces produced during bracing of the tensioning mechanism are captured in a very stiff system and advantageously led off. In the area of the spanning element, a three-layer reinforcement is provided which allows the absorption of high force components without any deformation of the corresponding section of the pipe coupling or pipe clamp.

The individual clamp band parts can be configured to be less solid compared with a conventional pipe coupling or pipe clamp for the same load-bearing capacity. Furthermore, different materials can be used for the individual clamp band parts which are combined according to the respective application. The pipe coupling or pipe clamp can thus be produced more cost-effectively.

Furthermore, mounting is substantially simplified with such a pipe coupling or pipe clamp which is particularly advantageous under tight space conditions, e.g. in trenches. As a result of the multipart configuration, the pipe coupling or pipe clamp is centred almost independently which additionally simplifies assembly.

Preferably each inner longitudinal slot is arranged offset with respect to the outer longitudinal slots with the result that the aforesaid advantages during bracing and also during mounting are additionally improved.

Preferably an inner clamp band part has a greater arc length than the external outer clamp band part so that this inner clamp band part projects at least on one side over the outer clamp band part assigned to this and covers the corresponding outer longitudinal slot in the assembled state of the pipe coupling or the pipe clamp. Particularly preferably an inner clamp part projects on both sides of the external outer clamp part assigned to this.

Preferably at least one of the inner clamp band parts is fixed on an outer clamp band part so that during mounting of the pipe coupling or pipe clamp, this inner clamp band part cannot be lost and thus the pipe coupling or pipe clamp can easily be mounted. Particularly advantageously each inner clamp band part is fixed on the external outer clamp band part assigned to this. The inner clamp part or parts are advantageously fixed positively and/or non-positively on the outer clamp part or parts, for example, by means of at least one weld point, at least one solder point, at least one rivet, at least one screw, at least one clinch point or an adhesive. The type of fixing is selected according to the type of material of the elements to be joined.

Preferably at least one separate flat spanning element is provided on the inner clamp band for spanning the inner longitudinal slots which extends over the inner longitudinal slots. Thus, tilting either of the inner clamp band or of the outer clamp band is prevented.

In pipes made of a soft material which can be easily deformed under load or with a corresponding pipe outer side, tilting of the inner longitudinal slot sides with the pipe outer side during bracing is prevented with the pipe coupling or pipe clamp according to the invention.

If a sealing insert is provided, any jamming of the sealing insert between the mutually opposite inner longitudinal slot sides during the bracing process is eliminated, which ensures a tight connection of the pipes to be connected.

As a result of this configuration of the pipe coupling or pipe clamp, the radial components of the screw forces produced during bracing of the tensioning mechanism are captured in a very stiff system and advantageously led off. In the area of the flat spanning element, a three-layer reinforcement is provided which allows the absorption of high force components without any deformation of the corresponding section of the pipe coupling or pipe clamp.

The flat spanning element advantageously has an extension which is sufficient for covering the inner longitudinal slots even in the unbraced state of the pipe coupling or the pipe clamp.

In one variant, preferably for each longitudinal slot respectively one flat spanning element is provided for spanning the same, which allows simple and cost-effective manufacture of the pipe coupling or the pipe clamp whilst a good bracing property of the pipe coupling or the pipe clamp is still ensured.

Preferably two separate flat spanning elements are provided at end regions of an inner clamp part which enables the pipe coupling or pipe clamp to be produced simply.

Further advantages, features and details of the invention are obtained from the following description in which exemplary embodiments of the invention are described with reference to the drawings. The features mentioned in the claims and in the description can each be essential to the invention individually by themselves or in any combination.

The reference list is part of the disclosure. The figures are described in a cohesive and overlapping manner. The same reference numbers denote the same components, reference numbers with different indices give functionally the same or similar components.

DETAILED DESCRIPTION

Figure 1:
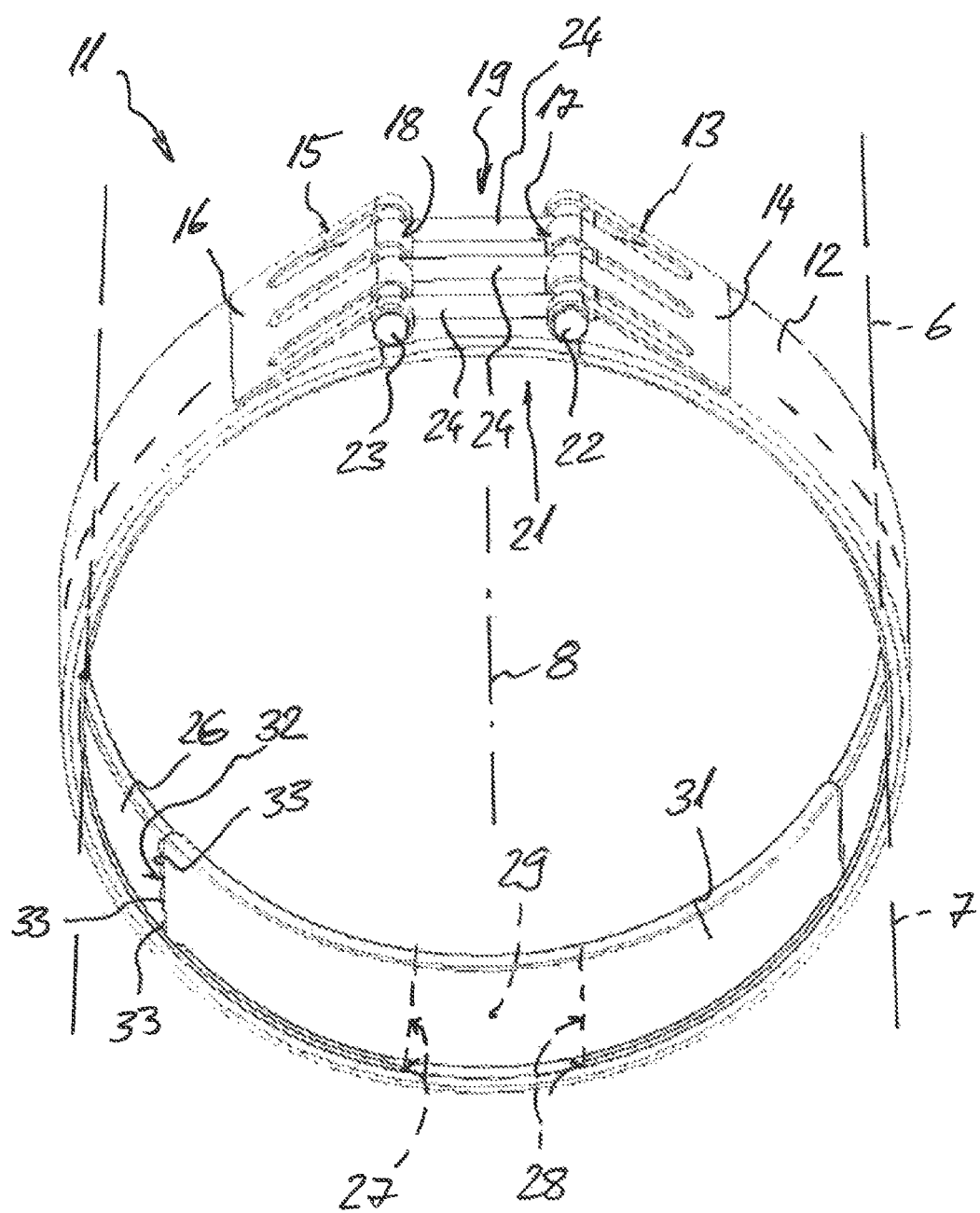
FIG. 1 shows an embodiment of a pipe coupling or pipe clamp according to the first approach of the invention in a perspective view.
Figure 2:
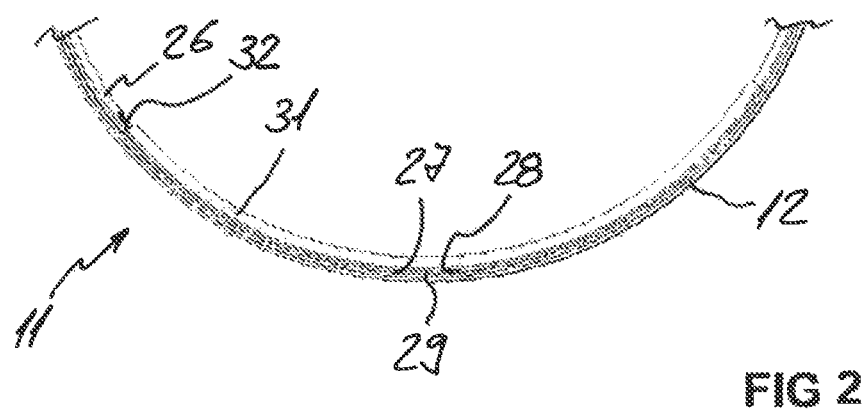
FIG. 2 shows a section through the inner slot of the embodiment according to FIG. 1.
Figure 6:
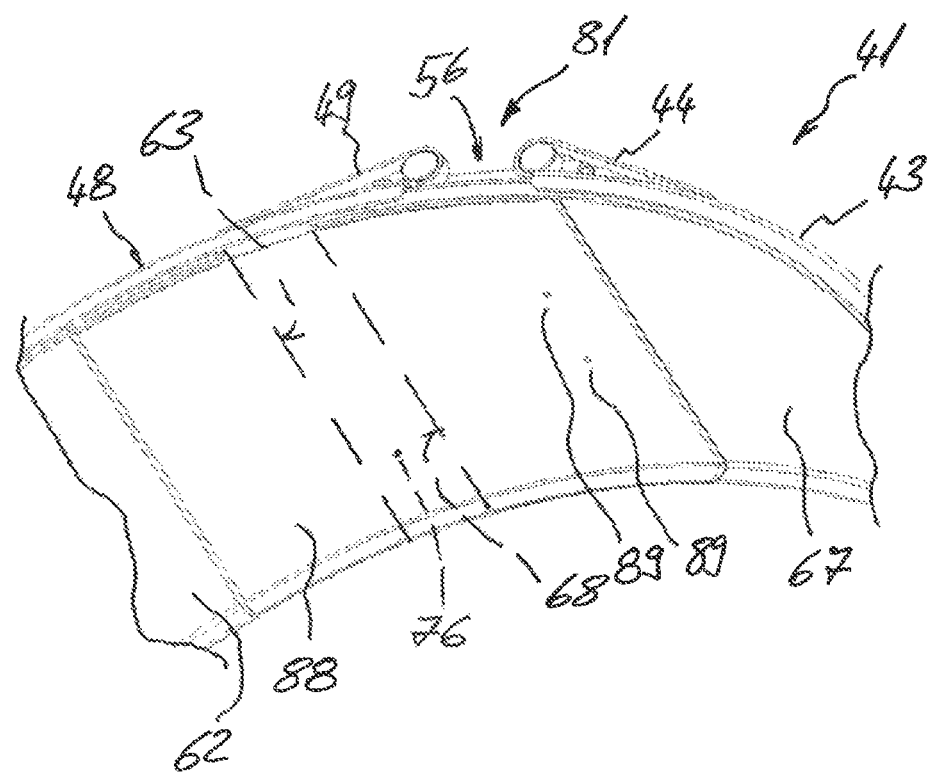
FIG. 6 shows a perspective view of the embodiment according to FIG. 3.
Figure 3:
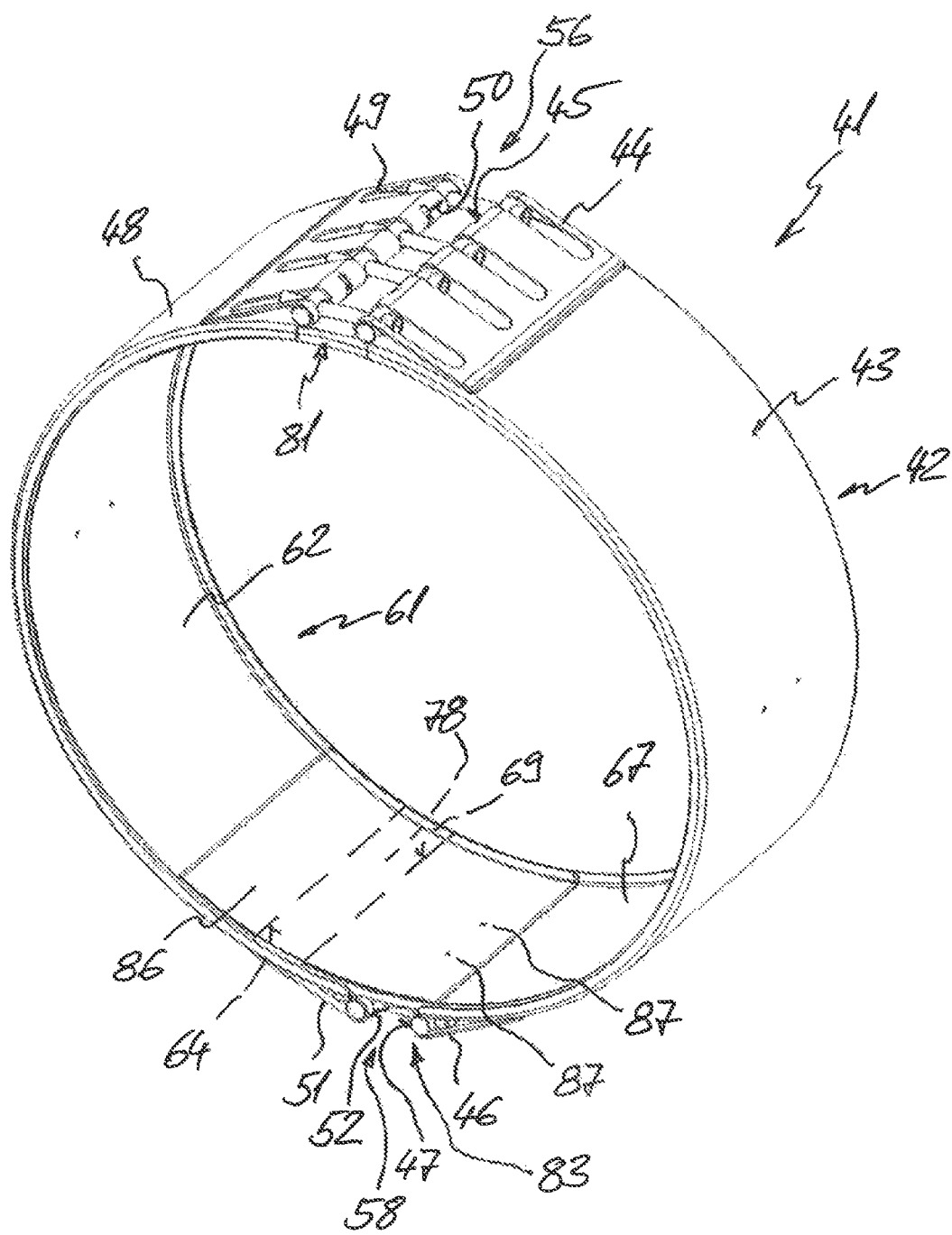
FIG. 3 shows an embodiment of a pipe coupling or pipe clamp according to the second approach of the invention in a perspective view.

FIGS. 1 and 2 show a pipe coupling 11 for connecting two pipe ends of the pipes 6 and 7. The pipes 6 and 7 define a pipe longitudinal axis 8. The pipe coupling 11 can also serve as a pipe clamp for sealing a defective pipe.

The pipe coupling 11 has an outer clamp band 12 whose free end regions are each formed into lugs 13 or 15 and whose ends 14 or 16 are fixed on the outside of the outer clamp band 12. The mutually opposite lugs 13 and 15 have mutually opposite outer longitudinal slot sides 17 and 18 between which an outer longitudinal slot 19 is formed. The outer longitudinal slot 19 extends parallel to the pipe longitudinal axis 8.

The pipe coupling 11 further has an inner clamp band 26 with mutually opposite inner longitudinal slot sides 27 and 28 between which an inner longitudinal slot 29 is formed.

The inner longitudinal slot 29 is arranged offset to the outer longitudinal slot 19, in this example offset by 180°. The inner longitudinal slot 29 extends parallel to the pipe longitudinal axis 8. The inner clamp band 26 is fixed on the outer clamp band 12. The inner clamp band 26 is for example fixed by at least one weld point on the outer clamp band 12.

One clamping bolt 22 and 23 is provided in each of the lugs 13 and 15 of the outer clamp band 12, through which clamping screws 24 pass, wherein at least in one of the clamping bolts 22 or 23 an internal thread section is provided in which an external thread section of the clamping screws 24 can engage. The clamping bolts 22 and 23 and the clamping screws 24 together form the tensioning mechanism 21 for reducing the inner diameter of the clamp bands 12 and 26 arranged on the outer clamp band.

Furthermore, a separate flat spanning element 31 for spanning the inner longitudinal slot 29 is provided in the inner clamp band 26. The flat spanning element 31 extends from the one inner longitudinal slot side 27 in the direction of the other inner longitudinal slot side 28 and beyond in each case. The flat spanning element 31 is fixed on one side, here at the spanning element end 32, for example with a plurality of weld points 33 on the inner clamp band 26 on the inner side thereof.

In the pipe coupling 41 shown in FIGS. 3 to 6, the outer clamp band 42 is configured in two parts and thus has an outer clamp band part 43 and 48. The free end regions of the outer clamp band part 43 are each formed into lugs 44 or 46 wherein the ends thereof are fixed on the outside of the outer clamp band part 43, e.g. via weld points or rivets or screws. The free end regions of the outer clamp band part 48 are also each formed into lugs 49 or 51, wherein the ends thereof are fixed on the outside of the outer clamp band part 48, e.g. via weld points or rivets or screws.

The mutually opposite lugs 44 and 49 have mutually opposite outer longitudinal slot sides 45 and 50 between which the outer longitudinal slot 56 is formed.

The mutually opposite lugs 46 and 51 have mutually opposite outer longitudinal slot sides 47 and 52 between which the outer longitudinal slot 58 is formed.

The inner clamp band 61 of the pipe coupling 41 is configured in two parts and thus has an inner clamp part 62 and an inner clamp part 67.

Figure 4:
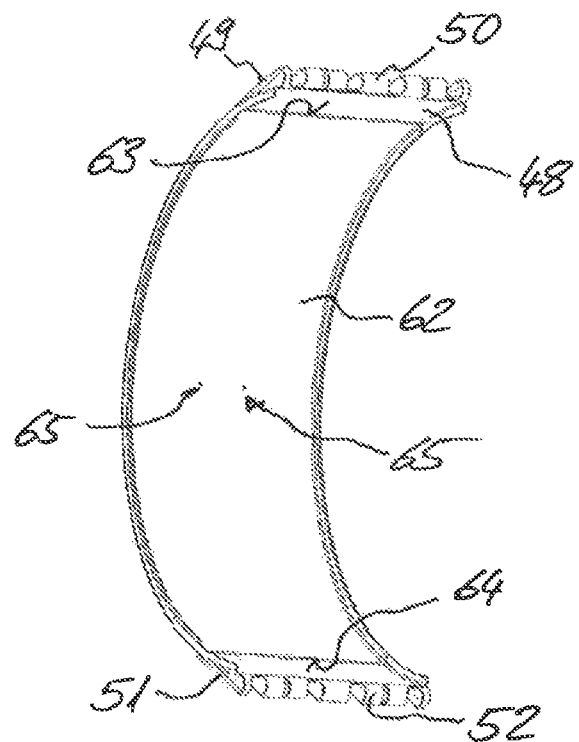
FIG. 4 shows a first outer clamp part of the embodiment according to FIG. 3 with an arranged first inner clamp part in a perspective view.

The inner clamp part 62 is fixed on the outer clamp part 48, e.g. via two weld points 65 (see FIG. 4). The inner clamp part 62 further has an arc length defined by inner longitudinal slot sides 63 and 64 which is shorter than the arc length of the outer clamp part 48. In the present example the inner longitudinal slot sides 63 and 64 of the inner clamp part 62 are spaced apart from the outer longitudinal slot sides 50 and 52 of the outer clamp part 48 by approximately the same distance.

Figure 5:
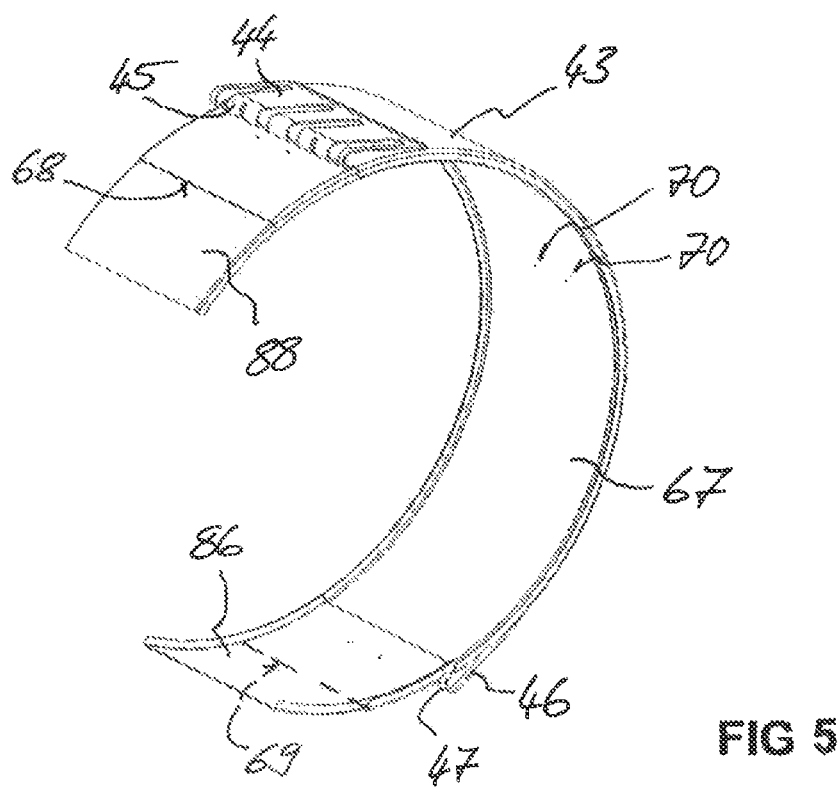
FIG. 5 shows a second outer clamp part of the embodiment according to FIG. 3 with an arranged second inner clamp part in a perspective view.

The inner clamp part 67 is fixed on the outer clamp part 43, e.g. via two weld points 70 (see FIG. 5). The inner clamp part 67 further has an arc length defined by inner longitudinal slot sides 68 and 69 which is longer than the arc length of the outer clamp part 43. In the present example the inner longitudinal slot sides 68 and 69 of the inner clamp part 67 project beyond the outer longitudinal slot sides 45 and 47 of the outer clamp part 43 by approximately the same distance.

In the assembled state of the pipe coupling 41 (see FIGS. 3 and 6) an inner longitudinal slot 76 is formed between the mutually opposite inner longitudinal slot sides 63 and 68. An inner longitudinal slot 78 is formed between the mutually opposite inner longitudinal slot sides 64 and 69. The inner longitudinal slot 76 is arranged offset with respect to the outer longitudinal slot 56 and the inner longitudinal slot 78 is arranged offset with respect to the outer longitudinal slot 58.

At the outer longitudinal slot 56 a first tensioning mechanism 81 is provided and at the outer longitudinal slot 58 a second tensioning mechanism 83 is provided for reducing the inner diameter of the pipe coupling 41. Instead of two tensioning mechanisms, it would also be feasible to provide only one of the same and configure the other merely as a hinged connection.

At the free end regions of the inner clamp part 67, a separate flat spanning element 86 and 88 is provided in each case on the inside which extends over the inner longitudinal slots 76 or 78 in the combined and in the braced state of the pipe coupling 41. The flat spanning elements 86 and 88 are each fixed positively and/or non-positively to the inner clamp part 67, here by means of weld points 87 or 89. Alternatively the flat spanning elements 86 and 88 can also be fixed with rivets or screws to the clamp part 67.

REFERENCE LIST

6 Pipe
7 Pipe
8 Pipe longitudinal axis
11 Pipe coupling
12 Outer clamp band
13 Lug
14 End
15 Lug
16 End
17 Outer longitudinal slot side
18 Outer longitudinal slot side
19 Outer longitudinal slot
21 Tensioning mechanism
22 Bolt
23 Bolt
24 Clamping screw
25 Inner clamp band
27 Inner longitudinal slot side
28 Inner longitudinal slot side
29 Inner longitudinal slot
31 Spanning element
32 Spanning element end
33 Weld point
41 Pipe coupling
42 Outer clamp band
43 Outer clamp band part
44 Lug of 43
45 Outer longitudinal slot side
46 Lug of 43
47 Outer longitudinal slot side
48 Outer clamp part
49 Lug of 48
50 Outer longitudinal slot side
51 Lug of 48
52 Outer longitudinal slot side
56 Outer longitudinal slot
58 Outer longitudinal slot
61 Inner clamp band
62 Inner clamp band part
63 Inner longitudinal slot side
64 Inner longitudinal slot side
65 Weld point
67 Inner clamp band part
68 Inner longitudinal slot side
69 Inner longitudinal slot side
70 Weld point
86 Inner longitudinal slot
78 Inner longitudinal slot
82 Tensioning mechanism
83 Tensioning mechanism
86 Spanning element
87 Weld point
88 Spanning element
89 Weld point

The invention claimed is:

1. A pipe coupling for connecting two pipe ends or a pipe clamp for sealing a defective pipe comprising:
   an outer clamp band which includes at least two outer clamp band parts, and which has at least two outer longitudinal slots, each with mutually opposite outer longitudinal slot sides, wherein one of the at least two outer longitudinal slots is formed between respective ends of one of the at least two outer clamp band parts, and another of the at least two outer longitudinal slots is formed between respective ends of another of the at least two outer clamp band parts,
   an inner clamp band which includes at least two inner clamp band parts, and which has at least two inner longitudinal slots, each with mutually opposite inner longitudinal slot sides, wherein one of the at least two inner longitudinal slots is formed between respective ends of one of the at least two inner clamp band parts, and another of the at least two inner longitudinal slots is formed between respective ends of another of the at least two inner clamp band parts, and
   at least one tensioning mechanism for reducing an inner diameter defined by the outer clamp band and the inner clamp band,
   wherein at least one of the at least two inner longitudinal slots is arranged offset with respect to the at least two outer longitudinal slots, and
   wherein at least one of the at least two inner clamp band parts has a total arc length defined by the inner longitudinal slot sides of said one of the at least two inner clamp band parts, and at least one of the at least two outer band parts has a total arc length defined by the outer longitudinal slots sides of said one of the at least two outer clamp band parts, wherein the total arc length of said one of the at least two inner clamp band parts is greater than the total arc length of said one outer of the at least two outer clamp band parts.

2. The pipe coupling or pipe clamp according to claim 1, wherein at least one inner clamp band part is fixed on an outer clamp band part.

3. The pipe coupling or pipe clamp according to claim 1, wherein at least one separate flat spanning element is provided on the inner clamp band for spanning at least one of the at least two inner longitudinal slots, wherein the at least one separate flat spanning element extends over a respective one of the at least two inner longitudinal slots.

4. The pipe coupling or pipe clamp according to claim 1, wherein at least one flat spanning element is provided for spanning the at least two inner longitudinal slots.

5. The pipe coupling or pipe clamp according to claim 4, wherein the at least one flat spanning element includes two separate flat spanning elements, each of which is provided at end regions of a respective one of the at least two inner clamp band parts.

* * * * *